United States Patent [19]

Hanseman

[11] 3,761,607

[45] Sept. 25, 1973

[54] VIDEO MONOCHROM TO COLOR CONVERSION

[75] Inventor: Carl Hanseman, Burbank, Calif.

[73] Assignee: Technicolor, Inc., Hollywood, Calif.

[22] Filed: Feb. 15, 1972

[21] Appl. No.: 226,523

Related U.S. Application Data

[63] Continuation of Ser. No. 873,194, Nov. 3, 1969, abandoned.

[52] U.S. Cl. .............................................. 178/5.4 R

[51] Int. Cl. .............................................. H04n 9/04

[58] Field of Search ...................... 178/5.2 R, 5.4 R, 178/5.2 A

[56] References Cited

UNITED STATES PATENTS

| | | | |
|---|---|---|---|
| 3,551,589 | 12/1970 | Moskovitz | 178/5.4 R |
| 2,593,925 | 4/1952 | Sheldon | 178/5.4 R |
| 2,874,212 | 2/1959 | Bechley | 178/5.4 R |
| 3,054,852 | 9/1962 | Schroeder | 178/5.4 R |
| 3,078,340 | 2/1963 | Willey | 178/5.4 R |
| 3,258,528 | 6/1966 | Oppenheimer | 178/5.4 R |

*Primary Examiner*—Robert L. Richardson
*Attorney*—Dike, Bronstein, Roberts & Cushman

[57] ABSTRACT

Apparatus and method for synthesizing a color video signal from a black and white video signal. The various amplitude levels of the black and white signal are separated by threshold detectors to produce separate gating signals during the interval of each amplitude level. Color signals of selected hue and saturation are provided for each amplitude level by modifying the phase and amplitude of the signal provided by a 3.58 mhz subcarrier generator. In the appropriate intervals the gating signals pass the color signals to an adder, where they are combined with the black and white signals to furnish a color composite video signal suitable for broadcasting or recording.

17 Claims, 2 Drawing Figures

Inventor
Carl Hanseman
by Roberts, Cushman & Grover
Att'ys

VIDEO MONOCHROM TO COLOR CONVERSION

This is a continuation, of application Ser. No. 873,194, filed on Nov. 3, 1969 and now abandoned.

BACKGROUND OF THE INVENTION

The field of this invention relates to color television apparatus and methods, and involves the conversion of monochrome video signals into color (polychrome) video signals.

In television programming, the popularity of color apparatus and methods has introduced problems: old black and white programming materials, particularly cartoons, despite their high costs and entertainment value, lose commercial value because of a bias in favor of the more prestigious color materials. Furthermore, the need to produce titles, commercials, and special effects in color has added to costs and to production difficulties. Color motion picture film programming is not a completely satisfactory answer to the problems, because it necessitates color photographic processes which are expensive and time consuming.

SUMMARY OF THE INVENTION

Objects of the present invention are to provide method and apparatus which enable monochrome video information to be easily converted to color video information, therefore permitting color television programming to be derived from black and white materials.

According to the invention, the method for producing a multicolor video signal from a monochrome video signal having various intensity levels comprises, first, separating the monochrome signal into signals of different intensity levels, and then using each level signal to gate a color signal in the same time interval as the level signal, respective level signals gating different color signals. The respective color signals so gated are added to the monochrome signals in the same respective intervals as the level signals during which the respective color signals were gated, thereby to produce a composite video signal with color components in controlled relation to the respective intensity levels of the monochrome signal.

Apparatus according to the invention comprises a luminance channel receiving the monochrome signal; a plurality of detectors connected to the luminance channel, each responsive to the monochrome signal to generate a gating signal at a selected amplitude level of said monochrome signal; a plurality of color channels each connected to a respective detector, each channel including means responsive to said gating signal to generate a selected color signal; and means connected to said luminance and color channels to add each said color signal to said monochrome signal in the same respective interval in which the selected amplitude level occurred in the monochrome signal, thereby to produce a composite video signal with controlled color components.

These and other objects and novel aspects of the invention will be apparent from the following description of preferred embodiments.

DESCRIPTION OF THE PREFERRED EMBODIMENTS

Figure 1:
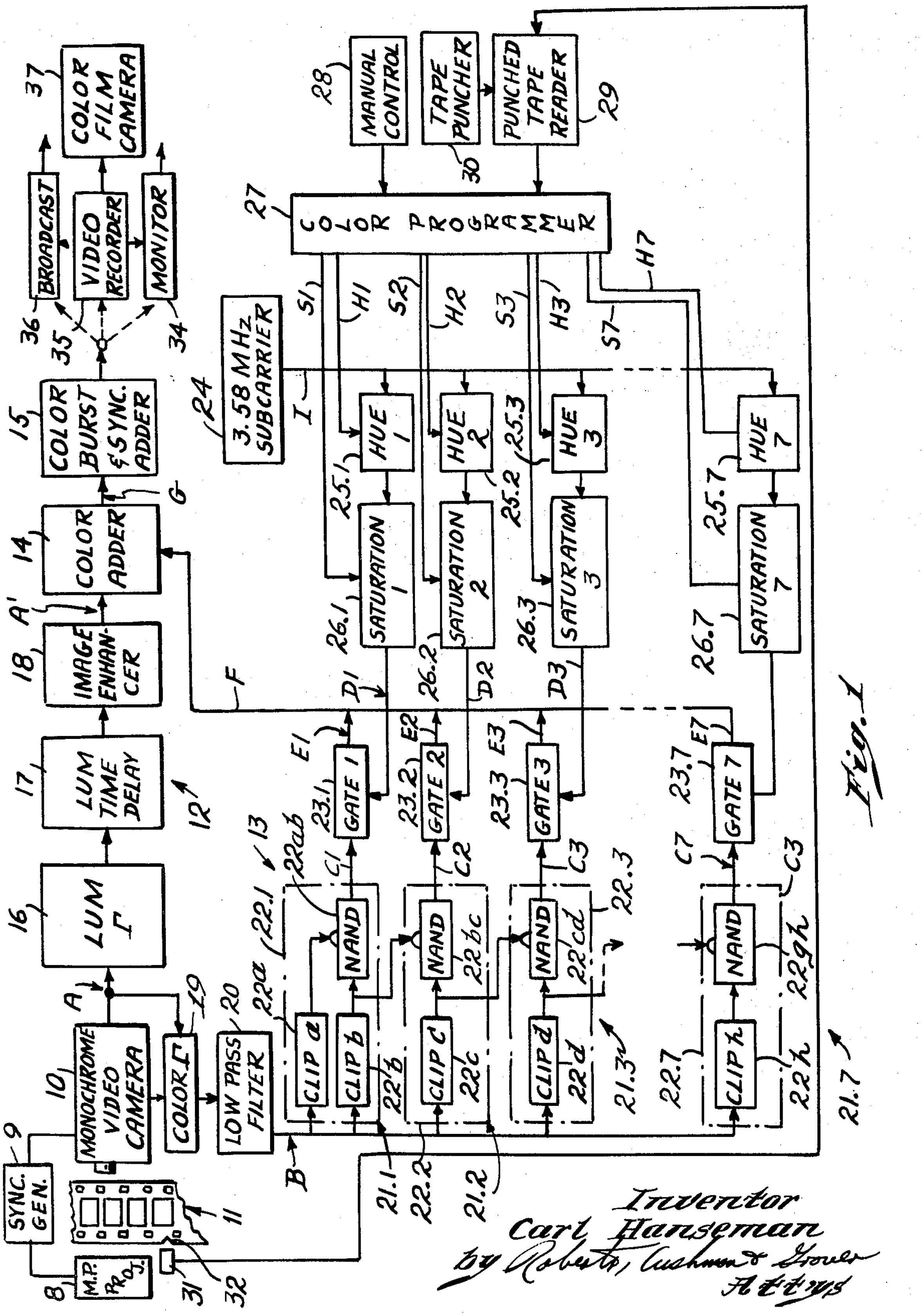
FIG. 1 is a diagram of a system according to the present invention.

FIG. 1 illustrates a system designed to accept a black and white television video signal, produced with a color television synchronizing generator operating on NTSC color standards, and convert it to a composite NTSC color television signal with selected colors corresponding to selected intensity levels in the black and white signal. While the NTSC system is illustrated, both for convenience and because of the large practical value of that system, it should be borne in mind that the concepts of the present invention can be employed in any color television system which scans line by line and generates an amplitude-varying signal to represent intensity.

In FIG. 1 a monochrome video signal is produced at point A by a monochrome television camera 10 scanning a black and white motion picture film 11 fed through a projector 8. Both the camera and projector are controlled by a synchronizing generator 9 operating on NTSC color standards. The signal at point A varies in amplitude according to the light intensity of the incremental areas scanned, with "black" corresponding to zero amplitude and "white" corresponding to maximum amplitude. A video tape recording of such a video signal could serve as a substitute source.

The monochrome video signal at point A forms the input both to a luminance channel 12 which modifies the black and white signal, and to a coloring channel 13 which supplies selected color signals in accordance with the invention as described below. The outputs of the two channels are added together in color adder 14, and a color burst and sync pulse are inserted at 15 to complete the NTSC color composite video signal.

LUMINANCE CHANNEL

The luminance channel 12 contains a conventional luminance gamma correction means 16, for example a non-linear amplifier, to exaggerate or stretch contrast in the extreme black and white ranges relative to the middle tones. Contrast emphasis of this sort improves the tonal quality of the signal as reproduced on kinescope display.

The gamma corrected monochrome video signal is delayed in a time delay circuit 17 to establish coincidence at adder 14 with the signal from the coloring channel 13. A delay of approximately 1.3 microseconds is typically required, and is easily obtained with provisions for precise adjustments in a conventional time delay ladder network with distributed capacitance and inductance.

After passing through time delay 17, the monochrome video signal is applied to a conventional image enhancer 18, which improves the sharpness of the signal as seen on kinescope display by increasing the rise time or sharpness of edge transitions, and by increasing the modulation depth of high frequency portions of the signal, which correspond to a heightening of contrast in fine image detail. The output at point A' of image enhancer 18 is applied to color adder 14, where the color signals produced in the color channel 13 described below are combined with it.

COLOR CHANNEL

The color channel 13, briefly summarized, first modifies the monochrome video signal appearing at point A to improve its characteristics for threshold detection. The modified signal, appearing at point B, is applied simultaneously to a group of parallel color sub-channels 21, each of which includes a threshold detector 22, and a gate 23 for passing coloring information from hue 25 and saturation 26 signal sources to the adder 14 when a gating signal is provided by the threshold detector. The bank of threshold detectors, each detecting the presence of monochrome signal within a specified amplitude level, separates the modified signal at point B into its different intensity levels, and produces gating signals contemporaneous with these levels to gate that sub-channel's color information.

In greater detail, the monochrome video signal at point A is modified to render it better suited for threshold detection by means of color gamma corrector 19 and low pass filter 20. The color gamma corrector 19 is similar to the luminance gamma corrector 16 in that it exaggerates or emphasizes contrast in some intensity ranges more than in others, but it is used for a different purpose, i.e., to separate close intensity signals so that they can be more easily distinguished by the threshold detectors which follow. Thus the emphasis range of color gamma corrector 19 will not necessarily duplicate that of luminance gamma corrector 16, but will be determined by the location of closely adjacent intensity levels which are to be distinguished to provide a sharp line of damarcation between added colors. In some instances it may be desirable to adjust the gamma corrector 19 to the particular tonal values found in the programming material 11, and controls for this purpose (not shown) can be provided. Such controls can also be used to assist in centering a particular signal amplitude within the amplitude detection level of a particular threshold detector.

A low pass filter 20 receives the monochrome video signal from color gamma corrector 19 and removes high frequency noise spikes which would cause false amplitude levels to be detected by the following threshold detectors with the result that undesired color signals would be keyed into the final composite signal. A frequency cut-off level of approximately 0.5 mhz is appropriate to remove noise and furnish adequate smoothing in the NTSC system. Other systems using greater bandwidths to develop greater resolution and definition would use a higher frequency cut-off.

The filtered monochrome video signal at point B is applied simultaneously to the inputs of the color sub-channels 21, designated as 21.1, 21.2, 21.3 . . . 21.7. The total number of color sub-channels to be provided, as will be apparent, depends on the maximum number of different colors to be supplied to the image. The illustrated example may use seven such color sub-channels, three of which are omitted from FIG. 1 for clarity of illustration.

In each color sub-channel 21.1 to 21.7 the monochrome video signal is applied to a threshold detector 22.1 to 22.7, respectively, biased to detect video signals within a particular amplitude level. The several threshold detectors are biased differently so that each detects a different amplitude level, and the several different amplitude detection levels are adjusted to be contiguous so that all amplitudes in a continuum of interest will be detected. A suitable correlation for amplitude detection levels is illustrated graphically in FIG. 2A, which shows the waveform of a single scan line of the monochrome video signal 100 appearing at point B. The waveform is plotted with time as the horizontal variable and amplitude as the vertical variable. The amplitude range of monochrome signal 100 is divided into nine contiguous bands or amplitude levels, the boundaries of which are shown by the horizontal dashed lines a through h in FIG. 2A. Of the nine levels, the middle seven are to be detected by threshold detectors 22.1 to 22.7. The top and bottom amplitude levels correspond to the colors white and black which are to be left unaltered in the final composite signal. It can be readily appreciated that adjustability of the detected amplitude levels will permit accurate centering of recurring signal amplitudes within the detection levels, and will permit close signal amplitudes to be distinguished and given different colors.

Illustrated threshold detectors 22.1 through 22.7 detect monochrome amplitudes within a prescribed detection level first by inversely limiting or clipping the monochrome signal at both the upper and lower boundaries of the level, i.e., by passing portions of the signal exceeding the boundaries, and then by blocking the lower clipper signal with the upper clipper signal in a NAND gate. The output of the NAND gate is a signal present only during the intervals in which the monochrome signal is within the detection level. Thus threshold detector 22.1 comprises clippers **22*a* and 22*b*** biased to pass those portions of the monochrome signal at point B which exceed the upper and lower boundaries *a* and *b*, respectively, of detector level 1 shown in FIG. 2A. A NAND gate **22*ab* receives the clipped outputs and passes the output of lower clipper 22*b* to point C1 whenever there is no output from upper clipper 22*a*. In similar fashion threshold detectors 22.2 through 22.7 comprise clippers 22*c* through 22*h*** biased to clip at boundaries *c* through *h*, respectively, and NAND gates **22*bc* through 22*gh* connected to pass signals within detector levels 2 through 7, respectively. Since detector levels 1 through 7 are contiguous, each of the threshold detectors 22.2 to 22.7 need include only a single clipper for the lower boundary, utilizing the clipper in the next adjacent detector to provide the inhibiting signal for the upper boundary, as shown in FIG. 1.**

The outputs of threshold detectors 22.1 through 22.7 are gating signals, appearing at points C1 through C7, which are applied to gates 23.1 to 23.7, respectively, to control the passage of color signals from each color sub-channel to the adder 14. FIG. 2B shows four typical gating signals 101 through 104 appearing at points C1 through C4 and generated by the waveform of FIG. 2A. The gating signals have a first high value when the detectors detect an amplitude within the detection level for which they are biased, and a second low value at all other times.

The gating signals produced in the detectors 22.1 to 22.7 are applied to and control individual gates 23.1 to 23.7 to pass the color video signals appearing at points D1 to D7 through the gates to adder 14 during the presence of a gating signal and to block the color video signals at other times.

The color video signals at point D1 through D7 are derived from a common 3.58 mhz sub-carrier generator 24. To obtain the color signals appearing at points D1 to D7 in the color sub-channels, the 3.58 mhz subcarrier at point I is applied in each color sub-channel first to hue or phase shifter stages 25.1 to 25.7, to select hue, and then to saturation amplitude control stages 26.1 to 26.7, to select saturation level. Typical signals so selected are indicated at 111 to 114 in FIG. 2C (the phase shift cannot be shown because of the drawing scale).

The phase shifters 25.1 to 25.7 may perform a fixed, predetermined phase shift, but preferably are designed to vary hue in response to the value of a control voltage in control lines H1 to H7. Suitable examples of a phase shifter of this type are well-known. In similar fashion, the controllable amplitude devices 26.1 to 26.7 are designed to vary saturation level in response to the value of a control voltage in control line S1 to S7. If the subject matter of the film will allow untoned color the saturation stages may be omitted and all color information derived from fixed or controlled hue phase shifters.

Control lines S1 to S7 and H1 to H7 lead from a color programmer 27 which provides analog control voltages for the hue and saturation devices in accordance with settings of a manual control input 28, or in accordance with digital instructions on punched tape read by punched tape reader input 29. Suitable digital to analog programming devices able to carry out these operations are conventional.

The need for color programmer 27 arises because not all black and white signals will have the same tonal values. When film 11 contains successive scenes which call for different correspondences between color and amplitude level, color editing of the material 11 must proceed scene by scene, and the task is simplified if the color correspondences established by manual control 28 can be recorded, by a tape punching means 30, and later retrieved by punched tape reader input 29. To permit automatic changing of color correspondences in synchronism with scene changes in film 11, the scene changes can be marked by magnetic or mechanical indicators such as an edge notch 31 on the film 11. The edge notch can be detected by a magnetic or mechanical sensor 32 which signals the punched tape reader 29 to step its tape to a new reading position, corresponding to a new scene, wherein reading of the tape sends a different control signal to the color programmer. Alternatively, synchronism can be obtained by programming timing information which causes color correspondences to change at specified times determined by a clock.

Figure 2:
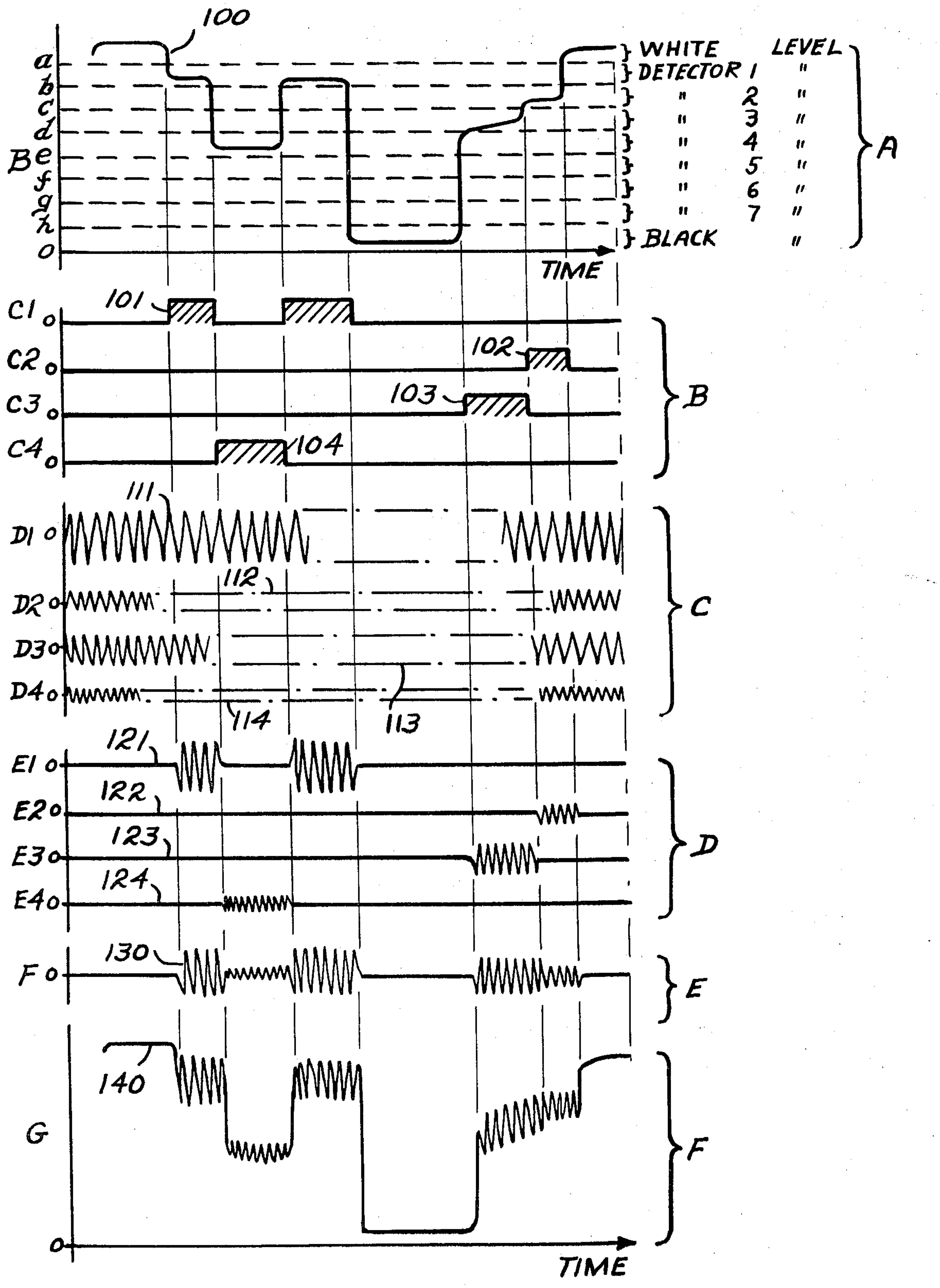
FIG. 2 is a waveform diagram illustrating waveforms at designated points within the system, the waveforms employing a common horizontal time scale.

Whether the hue phase shifters 25.1 through 25.7 and the saturation stages 26.1 through 26.7 are fixed or controlled by the programmer they provide sources of different color information in that the differently phase shifted 3.58 mhz sub-carrier signals 111 through 114 at points D1 to D4 represent different hues of selected saturation. During the interval of each of the video level signals C1 to C7, the level signal opens the corresonding gate which then passes the selected color signal to the adder 14 for the duration of the particular level signal. An example of this gating action is shown in FIG. 2 where color signals 111 to 114 at points D1 to D4 (FIG. 2C) are gated by gating signals 101 to 104 at points C1 to C4 (FIG. 2B) to produce gated color signals 121 to 124 at points E1 to E4 (FIG. 2D). The sum of the signals 121 to 124 is waveform 130 at point F (FIG. 2E) which is added to the monochrome signal at A' to produce the composite color signal 140 at point G (FIG. 2F), which now consists of the original monochrome picture information with color components added under the control of the amplitude levels of the original monochrome signal.

Functional applications for the present system include use as a color editing device, in which black and white programming material 11 is repeatedly viewed by the system until proper color correspondence, as seen on a monitor 34, is obtained with manual control 28. Once the proper color correspondence is obtained, the composite color video signal can be recorded scene by scene or continuously on a video recorder 35, or transmitted by broadcast equipment 36. Using recently developed techniques for producing color film from color video signals, the signal also can be applied to a special color film camera 37 to obtain color film from black and white film.

Illustrative practical applications of the system include the transformation of black and white motion picture cartoons into full color television pictures which can be recorded on magnetic video tape for subsequent use in television broadcasting. New generation motion picture cartoons with controlled gray scale characteristics can be photographed in black and white, and this system then utilized to provide full color, at substantial savings of time and money. Color correspondence changes can be directly programmed on such film at the time it is made. The creative possibilities of the device are virtually limitless in the colorizing of not only cartoons, but also commercials and special effects.

It should be understood that the present disclosure is for the purpose of illustration, and that the invention includes all modifications within the scope of the appended claims.

What is claimed is:

1. Apparatus for producing multicolor video signal from a monochrome video signal having a plurality of amplitude levels comprising a luminance channel receiving said monochrome signal, color signal generating means for producing a plurality of different color signals, color subchannel means connected to said color generating means and responsive to selected amplitude level increments of said monochrome signal at selected intervals for selectively supplying one of said color signals to said luminance channel in each said selected interval, and means connected in said luminance channel and responsive to said selectively supplied color signals for adding said selectively supplied color signal to said monochrome signal in the same respective interval in which said selected amplitude level increments occurred in said monochrome signal, thereby to produce a video signal with controlled color components.

2. Apparatus according to claim 1 wherein said color signal generating means comprises a color sub-carrier generator, a plurality of color channels, each comprising means for modifying the phase of said sub-carrier to determine hue in response to the level of a first control signal, means for modifying the amplitude of said sub-carrier to determine saturation level in response to the level of a second control signal, and programmer means connected to said phase and amplitude modifying means and generating said first and second control signals, said programmer means generating said control signals in response to digital input information.

3. Apparatus according to claim 2 wherein said programmer means further comprises means for generating said control signals in response to a normally adjustable input.

4. Apparatus according to claim 2 wherein said programmer means further comprises means for changing said first and second control signals in response to an external synchronizing signal.

5. Apparatus according to claim 1 wherein said color subchannel means includes a plurality of detectors connected to said luminance channel and responsive to said monochrome signal for producing a plurality of gating signals each corresponding to a selected amplitude level increment of said monochrome signal, and a plurality of gating means actuated by said gating signals, each said gating means being responsive to one of said color signals and supplying said color signal to said luminance channel in response to the actuation thereof by said gating signals.

6. Apparatus according to claim 5 wherein the amplitude level increments detected by said detectors are contiguous over an amplitude range of said monochrome signal.

7. Apparatus according to claim 1 wherein said luminance channel comprises time delay means for synchronizing said monochrome signal and said color signals at said adding means.

8. Apparatus according to claim 1 wherein said color signal generating means comprises a color sub-carrier generator, and a plurality of color channels, each comprising means for modifying the phase and amplitude of said sub-carrier to provide a source of *a* color signal of selected hue and saturation level.

9. Apparatus according to claim 1 further comprising means in advance of said detectors for removing noise from said monochrome signal.

10. Apparatus according to claim 1 further comprising means in advance of said detectors for selectively increasing the separation between adjacent amplitude level increments in said monochrome signal, thereby to facilitate distinction between such amplitude level increments by said detectors.

11. The method of producing a multicolor video signal from a monochrome video signal having various intensity levels comprising, separating the monochrome signal into level signals of different intensity level increments, using each level signal to gate a color signal in the same time interval as the level signal, respective level signals gating different color signals, and adding the respective color signals to the monochrome signal in the same respective intervals as the level signals during which the respective color signals were gated, thereby to produce a video signal with color components in controlled relation to the respective intensity levels of the monochrome signal.

12. Method according to claim 11 further comprising filtering said monochrome signal to remove noise prior to separating it into level signals of different intensity level increments.

13. Method according to claim 11 further comprising altering said monochrome signal to exaggerate differences between adjacent intensity level increments prior to separating said signal.

14. Method according to claim 11 wherein the separation of said monochrome signal into signals of different intensity level increments comprises applying said monochrome signal simultàneously to a plurality of detectors, and setting each detector for response to signals within a prescribed amplitude level increment, said amplitude level increments being contiguous over a range of amplitudes of said nonochrome signal.

15. Method according to claim 11 wherein said different color signals are obtained by generating a color sub-carrier signal, by selectively phase shifting said sub-carrier signal to select hue, and by selectively amplitude modifying said sub-carrier signal to select saturation level.

16. Method according to claim 15 further comprising controlling said phase shifting and amplitude modification of the sub-carrier by means of control signals, and generating said control signals in response to digital information.

17. Method according to claim 11 further comprising generating a synchronizing signal corresponding to color changes in said monochrome signal, and changing the hue and saturation of each different color signal in response to said synchronizing signal.

* * * * *